(12) United States Patent
Lin et al.

(10) Patent No.: US 12,300,033 B2
(45) Date of Patent: May 13, 2025

(54) APPARATUS, METHOD AND SYSTEM FOR PERSON DETECTION AND IDENTIFICATION UTILIZING WIRELESS SIGNALS AND IMAGES

(71) Applicants: Robert Bosch GmbH, Stuttgart (DE); The Research Foundation for The State University of New York, Albany, NY (US)

(72) Inventors: Shan Lin, Jericho, NY (US); Hongkai Chen, Smithtown, NY (US); Sirajum Munir, Pittsburgh, PA (US)

(73) Assignees: Robert Bosch GmbH (DE); The Research Foundation for The State University of New York, Albany, NY (US)

( * ) Notice: Subject to any disclaimer, the term of this patent is extended or adjusted under 35 U.S.C. 154(b) by 455 days.

(21) Appl. No.: 17/728,543

(22) Filed: Apr. 25, 2022

(65) Prior Publication Data
US 2022/0262164 A1    Aug. 18, 2022

(51) Int. Cl.
*G06V 40/20* (2022.01)
*G06Q 50/26* (2024.01)
(Continued)

(52) U.S. Cl.
CPC ........... *G06V 40/20* (2022.01); *G06Q 50/265* (2013.01); *G06V 10/98* (2022.01); *H04N 7/183* (2013.01); *H04W 4/029* (2018.02)

(58) Field of Classification Search
None
See application file for complete search history.

(56) References Cited

U.S. PATENT DOCUMENTS 10,997,474 B2 *   5/2021   Munir .................. H04W 64/003
2021/0034927 A1 *  2/2021   Munir .................... G06V 10/80
(Continued)

OTHER PUBLICATIONS

Du et al., "EV-Linker: Mapping eavesdropped Wi-Fi packets to individuals via electronic and visual signal matching," Journal of Computer and System Sciences 82 (2016) 156-172 (Year: 2016).*
(Continued)

*Primary Examiner* — Soo Shin
(74) *Attorney, Agent, or Firm* — Dickinson Wright PLLC (57) ABSTRACT

Methods and systems for identifying persons utilizing a camera and a wireless transceiver. The wireless transceiver receives wireless packets (e.g., Wi-Fi packets) from one or more mobile devices associated with one or more persons. The channel state information (CSI) is determined based on signals associated with the packets, and first motion characteristics are determined based on the CSI data. Congruently, the camera generates images, and associated image data is received, wherein the image data is associated with the one or more persons. Second motion characteristics are determined based on the image data. The first motion characteristics are matched with the second motion characteristics along with a quantified uncertainty, and the matched motion characteristics are assigned with weights that are based on the second motion characteristics (e.g., image-based). The one or more persons are identified based on the matched motion characteristics and the weights.

19 Claims, 5 Drawing Sheets

(51) Int. Cl.
G06V 10/98 (2022.01)
H04N 7/18 (2006.01)
H04W 4/029 (2018.01)

(56) References Cited

U.S. PATENT DOCUMENTS

| 2021/0041548 | A1* | 2/2021 | Chen ..................... G01S 13/003 |
| 2021/0405173 | A1* | 12/2021 | Elias ..................... G01S 13/88 |
| 2022/0210605 | A1* | 6/2022 | Munir ..................... H04W 4/40 |
| 2022/0262164 | A1* | 8/2022 | Lin ..................... G06Q 50/265 |
| 2022/0272489 | A1* | 8/2022 | Ghazvinian Zanjani ................... H04W 4/029 |

OTHER PUBLICATIONS

Shangguan et al., "Relative Localization of RFID Tags using Spatial-Temporal Phase Profiling", 12th USENIX Symposium on Networked Systems Design and Implementation (NSDI '15), May 4-6, 2015, Oakland, CA, USA, pp. 251-263.
Shu et al., "Magicol: Indoor Localization Using Pervasive Magnetic Field and Opportunistic WiFi Sensing", IEEE Journal on Selected Areas in Communications, vol. 33, No. 7, Jul. 2015, pp. 1443-1457.
Singla et al., "Indoor Location Error-Detection via Crowdsourced Multi-Dimensional Mobile Data", MobiData'16, Jun. 30, 2016, Singapore, Singapore, 7 Pages.
Soltanaghaei et al., "Multipath Triangulation: Decimeter-level WiFi Localization and Orientation with a Single Unaided Receiver", MobiSys '18, Jun. 10-15, 2018, Munich, Germany, 13 Pages.
Tai et al., "Toward Reliable Localization by Unequal AoA Tracking", MobiSys '19, Jun. 17-21, 2019, Seoul, Korea, pp. 444-456.
Tan et al., "WiFinger: Leveraging Commodity WiFi for Fine-grained Finger Gesture Recognition", MobiHoc'16, Jul. 4-8, 2016, Paderborn, Germany, pp. 201-210.
Teixeira et al., "Tasking Networked CCTV Cameras and Mobile Phones to Identify and Localize Multiple People", UbiComp '10, Sep 26-Sep. 29, 2010, Copenhagen, Denmark, 10 Pages.
Tian et al., "Eliminating Background-bias for Robust Person Re-identification", 2018 IEEE/CVF Conference on Computer Vision and Pattern Recognition, 2018, pp. 5794-5803.
Vasisht et al., "Decimeter-Level Localization with a SingleWiFi Access Point", 13th USENIX Symposium on Networked Systems Design and Implementation (NSDI '16), Mar. 16-18, 2016, Santa Clara, CA, USA, pp. 165-178.
Vasisht et al., "Duet: Estimating User Position and Identity in Smart Homes Using Intermittent and Incomplete RF-Data", Proc. ACM Interact. Mob. Wearable Ubiquitous Technol., vol. 2, No. 2, Article 84. Publication date: Jun. 2018, 21 Pages.
Wang et al., "Enabling Live Video Analytics with a Scalable and Privacy-Aware Framework", ACM Trans. Multimedia Comput. Commun. Appl. 14, 3s, Article 64 (Jun. 2018), 24 pages.
Wang et al., "Gait Recognition Using WiFi Signals", UBICOMP '16, Sep. 12-16, 2016, Heidelberg, Germany, pp. 363-373.
Wang et al., "LiFS: Low Human-Effort, Device-Free Localization with Fine-Grained Subcarrier Information", MobiCom 16: Proceedings of the 22nd Annual International Conference on Mobile Computing and Networking: New York, Oct. 3-7, 2016, 16 Pages.
Website https://www.nytimes.com/2019/07/01/us/facial-recognition-san-francisco.html Jill Cowan, "San Francisco Banned Facial Recognition. Will California Follow?", Dated Jul. 1, 2019, Retrieved from the WayBack Machine Apr. 20, 2022, 5 Pages.
Website https://www.agentvi.com/product/innovi/ "Agent Video Intelligence. 2021. innoVi™", Dated Apr. 18, 2021, Retrieved from the WayBack Machine Apr. 20, 2022, 2 Pages.
Website http://www.i2vsys.com/video-analytic.html "Video Content Analytics Software Solution", Dated May 13, 2021, Retrieved from the WayBack Machine Apr. 21, 2022, 3 Pages.
Wu et al., "Silhouette Analysis-Based Action Recognition Via Exploiting Human Poses", IEEE Transactions on Circuits and Systems for Video Technology, vol. 23, No. 2, Feb. 2013, pp. 236-243.

Wu et al., "CSI-Based Indoor Localization", IEEE Transactions on Parallel and Distributed Systems, vol. 24, No. 7, Jul. 2013, pp. 1300-1309.
Xin et al., "FreeSense: Indoor Human Identification with WiFi Signals", IEEE Global Communications Conference (GLOBECOM), 2016, 7 Pages.
Xiong et al., "ArrayTrack: A Fine-Grained Indoor Location System", 10th USENIX Symposium on Networked Systems Design and Implementation 2013 (NSDI '13), pp. 71-84.
Xu et al., "Improving RF-Based Device-Free Passive Localization In Cluttered Indoor Environments Through Probabilistic Classification Methods", IPSN'12, Apr. 16-20, 2012, Beijing, China, 12 Pages.
Xu et al., "Towards Robust Device-Free Passive Localization Through Automatic Camera-Assisted Recalibration", SenSys'12, Nov. 6-9, 2012, Toronto, ON, Canada, 2 Pages.
Xu et al., "FollowUpAR: Enabling Follow-up Effects in Mobile AR Applications", MobiSys '21, Jun. 24-Jul. 2, 2021, Virtual, WI, USA, 13 Pages.
Xu et al., "iVR: Integrated Vision and Radio Localization with Zero Human Effort", Proc. ACM Interact. Mob. Wearable Ubiquitous Technol., vol. 3, No. 3, Article 114. Publication date: Sep. 2019, 22 Pages.
Yang et al., "Indoor Localization Using Improved RSS-Based Lateration Methods", IEEE Global Telecommunications Conference, 2009, 6 Pages.
Yang et al., "From RSSI to CSI: Indoor Localization via Channel Response", ACM Computing Surveys, vol. 46, No. 2, Article 25, Publication date: Nov. 2013, 32 Pages.
Yang et al., "iLPS: Local Positioning System with Simultaneous Localization and Wireless Communication", IEEE Conference on Computer Communications 2019, pp. 379-387.
Yin et al., "FishEyeRecNet: A Multi-Context Collaborative Deep Network for Fisheye Image Rectification", Computer Vision—ECCV 2018, 16 Pages.
Zhang et al., "RF Backscatter-based State Estimation for Micro Aerial Vehicles", IEEE Infocom 2020—IEEE International Conference on Computer Communications, 9 Pages.
Zhang et al., "WiFi-ID: Human Identification using WiFi signal", International Conference on Distributed Computing in Sensor Systems (DCOSS), 2016, 8 Pages.
Zhang et al., "Siamese Neural Network Based Gait Recognition for Human Identification", IEEE International Conference on Acoustics, Speech and Signal Processing (ICASSP), 2016, pp. 2832-2836.
Zhang et al., "A Flexible New Technique for Camera Calibration", IEEE Transactions on Pattern Analysis and Machine Intelligence, vol. 22, No. 11, Nov. 2000, pp. 1330-1334.
Zhang et al., "EV-Loc: Integrating Electronic and Visual Signals for Accurate Localization", MobiHoc'12, Jun. 11-14, 2012, Hilton Head Island, SC, USA, 10 Pages.
Zhang et al., "WiFi-based Cross-Domain Gesture Recognition via Modified Prototypical Networks", IEEE Internet of Things Journal 2021, 13 Pages.
Zhang et al., "HeartID: A Multiresolution Convolutional Neural Network for ECG-Based Biometric Human Identification In Smart Health Applications", IEEE Access 2017, vol. 5, pp. 11805-11816.
Zou et al., "A Robust Indoor Positioning System Based on the Procrustes Analysis and Weighted Extreme Learning Machine", IEEE Transactions on Wireless Communications, vol. 15, No. 2, Feb. 2016, pp. 1252-1266.
Zou et al., "Multiple Kernel Representation Learning for WiFi-based Human Activity Recognition", 2017 16th IEEE International Conference on Machine Learning and Applications, pp. 268-274.
Abdelnasser et al., "WiGest: A Ubiquitous WiFi-based Gesture Recognition System", arXiv:1501.04301v2 [cs.HC] May 18, 2015, 10 Pages.
Alahi et al., "RGB-W: When Vision MeetsWireless", 2015 IEEE International Conference on Computer Vision (ICCV), 2015, pp. 3289-3297.
Arora et al., "A Computer Vision System for Iris Recognition Based on Deep Learning", 8th International Advance Computing Conference (IACC) 2018, pp. 157-161.

(56) References Cited

OTHER PUBLICATIONS

Ayyalasomayajula et al., "BLoc: CSI-based Accurate Localization for BLE Tags", The 14th International Conference on emerging Networking EXperiments and Technologies (CoNEXT '18), Dec. 4-7, 2018, Heraklion, Greece, pp. 126-138.

Bo et al., "SilentSense: Silent User Identification via Dynamics of Touch and Movement Behavioral Biometrics" arXiv:1309.0073v1 [cs.CR] Aug. 31, 2013, 9 Pages.

Cao et al., "Enabling Public Cameras to Talk to the Public", Proc. ACM Interact. Mob. Wearable Ubiquitous Technol., vol. 2, No. 2, Article 63. Publication date: Jun. 2018, 20 pages.

Cao et al., "OpenPose: Realtime Multi-Person 2D Pose Estimation using Part Affinity Fields", higharXiv: 1812.08008v2 [cs.CV] May 30, 2019, 14 Pages.

Chen et al., "FiDo: Ubiquitous Fine-Grained WiFi-based Localization for Unlabelled Users via Domain Adaptation", Proceedings of The Web Conference 2020 (WWW '20), Apr. 20-24, 2020, Taipei, Taiwan, 11 Pages.

Di Luzio et al., "Mind Your Probes: De-Anonymization of Large Crowds Through Smartphone WiFi Probe Requests", The 35th Annual IEEE International Conference on Computer Communications, 2016, 9 Pages.

Duc Thanh Nguyen., "Human detection from images and videos", Doctor of Philosophy thesis, School of Computer Science and Software Engineering, University of Wollongong, 2012, 184 Pages.

Fang et al., "EyeFi: Fast Human Identification Through Vision and WiFi-based Trajectory Matching", Int Conf Distrib Comput Sens Syst Workshops. May 2020, 30 Pages.

Feng et al., "Wireless Channel Loss Analysis—A Case Study Using WiFi-Direct", International Wireless Communications and Mobile Computing Conference (IWCMC), 2014, pp. 244-249.

Guettari et al., "Multimodal Localization in the Context of a Medical Telemonitoring System", Annu. Int. Conf. IEEE Eng. Med. Biol. Soc. 2010, 4 Pages.

Hamdoun et al., "Person Re-Identification in Multi-Camera System by Signature Based on Interest Point Descriptors Collected on Short Video Sequences", Second ACM/IEEE International Conference on Distributed Smart Cameras, 2008, 7 Pages.

He et al., "Range-Free Localization Schemes for Large Scale Sensor Networks1", MobiCom '03: Proceedings of the 9th annual international conference on Mobile computing and networking Sep. 2003, 15 Pages.

Hong et al., "WFID: Passive Device-free Human Identification Using WiFi Signal", Mobiquitous '16, Nov. 28-Dec. 1, 2016, Hiroshima, Japan, 11 Pages.

Hong et al., "CrowdProbe: Non-invasive Crowd Monitoring With WiFi Probe", 2018 Association for Computing Machinery, vol. 1, No. 1, Article Publication date: Jul. 2018, 23 Pages.

Islam et al., "Wi-Fringe: Leveraging Text Semantics in WiFi CSI-Based Device-Free Named Gesture Recognition", arXiv:1908.06803v1 [eess.SP] Aug. 16, 2019, 14 Pages.

Jaisinghani et al., "Experiences & challenges with server-side WiFi indoor localization using existing infrastructure", Proceedings of the 15th EAI International Conference on Mobile and Ubiquitous Systems: Computing, Networking and Services (MobiQuitous), New York, Nov. 5-7, 2018, 12 Pages.

Karanam et al., "Magnitude-Based Angle-of-Arrival Estimation, Localization, and Target Tracking", 2018 17th ACM/IEEE International Conference on Information Processing in Sensor Networks, pp. 254-265.

Kefayati et al., "Wi2Vi: Generating Video Frames from WiFi CSI Samples", arXiv:2001.05842v1 [cs.CV] Dec. 30, 2019, 10 Pages.

Kempke et al., "SurePoint: Exploiting Ultra Wideband Flooding and Diversity to Provide Robust, Scalable, High-Fidelity Indoor Localization", SenSys '16, Nov. 14-16, 2016, Stanford, CA, USA, 13 Pages.

Kianoush et al., "Device-free RF human body fall detection and localization in industrial workplaces", IEEE Internet of Things Journal, vol. 4, No. 2, Apr. 2017, 11 Pages.

Korany et al., "XModal-ID: Using WiFi for Through-Wall Person Identification from Candidate Video Footage", MobiCom '19, Oct. 21-25, 2019, Los Cabos, Mexico, 15 Pages.

Kotaru et al., "SpotFi: Decimeter Level Localization Using WiFi", SIGCOMM '15, Aug. 17-21, 2015, London, United Kingdom, pp. 269-282.

Lin et al., "On the detection-to-track association for online multi-object tracking", Pattern Recognition Letters 2021, 8 Pages.

Liu et al., "Push the limit of WiFi based localization for smartphones", MobiCom'12, Aug. 22-26, 2012, Istanbul, Turkey, 13 Pages.

Liu et al., "TAR—Enabling Fine-Grained Targeted Advertising in Retail Stores", MobiSys '18, Jun. 10-15, 2018, Munich, Germany, 14 Pages.

Loquercio et al., "A General Framework for Uncertainty Estimation in Deep Learning", IEEE Robotics and Automation Letters. Preprint Version. Accepted Jan. 2020, 11 Pages.

Lorincz et al., "MoteTrack: a robust, decentralized approach to RF-based location tracking", Pers. Ubiquit. Comput. 2007, 15 Pages.

Lu et al., "Autonomous Learning for Face Recognition in the Wild via Ambient Wireless Cues", WWW '19: The World Wide Web ConferenceMay 2019, 11 Pages.

Lucas et al., "An iterative image registration technique with an application to stereo vision", Conference: Proceedings of the 7th International Joint Conference on Artificial Intelligence (IJCAI 1981), Aug. 24-28, pp. 674-679.

Lymberopoulos et al., "A Realistic Evaluation and Comparison of Indoor Location Technologies: Experiences and Lessons Learned", IPSN '15, Apr. 14-16, 2015, Seattle, WA, USA, 13 Pages.

Matte et al., "Defeating MAC Address Randomization Through Timing Attacks", WiSec'16, Jul. 18-22, 2016, Darmstadt, Germany, 6 Pages.

Munir et al., "Real-Time Fine Grained Occupancy Estimation using Depth Sensors on ARM Embedded Platforms", 017 IEEE Real-Time and Embedded Technology and Applications Symposium (RTAS), 2017, 12 Pages.

Nguyen et al., "Towards RF-based Localization of a Drone and Its Controller", The 5th Workshop on Micro Aerial Vehicle Networks, Systems, and Applications (DroNet'19), Jun. 21, 2019, Seoul, Republic of Korea 6 Pages.

Nguyen et al., "IdentityLink: User-Device Linking through Visual and RF-Signal Cues", Ubicomp '14, Sep. 13-17, 2014, Seattle, WA, USA, 12 Pages.

Nguyen et al., "LightSense: Exploiting Smart Bulbs for Practical Multimodal Localization", 2016 IEEE International Conference on Pervasive Computing and Communication Workshops (PerCom Workshops): Sydney, Mar. 14-18: Proceedings, Article 7457054, 5 Pages.

Pang et al., "802.11 User Fingerprinting", MobiCom'07, Sep. 9-14, 2007, Montreal, Quebec, Canada, pp. 99-110.

Papaioannou et al., "Accurate Positioning via Cross-Modality Training", SenSys'15, Nov. 1-4, 2015, Seoul, South Korea, pp. 239-251.

Parnandi et al., "Coarse In-building Localization with Smartphones", Conference: International Conference on Mobile Computing, Applications, and Services 2010, 13 Pages.

Qiu et al., "On the Feasibility of Real-Time Phone-to-Phone 3D Localization", SenSys'11, Nov. 1-4, 2011, Seattle, WA, USA, 14 Pages.

Rai et al., "Zee: Zero-Effort Crowdsourcing for Indoor Localization", MobiCom'12, Aug. 22-26, 2012, Istanbul, Turkey, 12 Pages.

Rallapalli et al., "WaveLoc: Wavelet Signatures for Ubiquitous Localization", 2016 IEEE 13th International Conference on Mobile Ad Hoc and Sensor Systems (MASS), 2016, 14 Pages.

Ruiz et al., "IDIoT: Towards Ubiquitous Identification of IoT Devices through Visual and Inertial Orientation Matching During Human Activity", 2020 IEEE/ACM Fifth International Conference on Internet-of-Things Design and Implementation (IoTDI), pp. 40-52.

Salomon et al., "Poster: Comparison of Channel State Information driven and RSSI-based WiFi Distance Estimation", International Conference on Embedded Wireless Systems and Networks (EWSN) Feb. 17-19, 2021, Delft, The Netherlands, 2 Pages.

(56) References Cited

OTHER PUBLICATIONS

Saputra et al., "Graph-based Thermal-Inertial SLAM with Probabilistic Neural Networks", Journal of Latex Class Files, vol. 14, No. 8, Aug. 2021, 20 Pages.
Savazzi et al., "Device-Free Human Sensing and Localization in Collaborative Human-Robot Workspaces: A Case Study", IEEE Sensors Journal, vol. 16, No. 5, Mar. 1, 2016, pp. 1253-1264.
Schmidt., "Multiple Emitter Location and Signal Parameter Estimation", IEEE Transactions on Antennas and Propagation, vol. AP-34, No. 3, Mar. 1986, pp. 276-280.

* cited by examiner

Algorithm 1: User-device Association and Human Identification using RFCam.

Input: Wi-Fi data; Video data; Window size:L; Number of users: N; Number of smartphones: $N_S$.

Output: Associated user-device ID pairs: $\{(ID_{c,j}, ID^*(j))\}_{j=1}^{N_S}$ and association probabilities $\{p_j\}_{j=1}^{N_S}$.

1  for each device $j = 1$ to $N_S$, in parallel do
2     Initialize $S = \{1,...,N\}$; $count_n^{i,+}$, $count_n^{i,-} = 0$, for $i = 1,...,N$.
3     for $t = 1$ to $L$ do
4        Compute device profile estimation using CSI data.
5        for $i = 1$ to $N$ do
6           Compute user profile estimation using video data.
7           Compute user profile similarity scores of each feature for user i and device j.
8           Compute significance factors $W_{n,t}(j)$ using temporal weighing module.
9           for $n \in \{\theta, d, a\}$ do
10             Compute $P_{n,t}$ using Eq. (4).
11       for $i = 1$ to $N$ do
12          if $P_{n,t}(i, j)$ is among the $K_S$ largest ($K_e$ smallest) in $\{p_{n,t}(i, j)\}_{i=1}^{N_S}$ then
13             $count_n^{i,+}$ $(count_n^{i,-})$ ++
14          if $count_n^{i,-} \geq l$ then
15             Remove user i candidacy: $S = S \setminus i$
16          if $count_n^{i,+} \geq l$ then
17             User i has full confidence: $I_{n,t}(j) \cdot W_{n,t}(j) \cdot p_{n,t}(i, j) = 1$ and $I_{n,t}(j) \cdot W_{n,t}(j) \cdot p_{n,t}(i', j) = 0$ for all $i' \neq i$
18    Find $ID^*(j)$, associated to device j with $ID_{c,j}$ and the association probability $p_j$ using Eq. (5) and normalized exponential function of vector $[\sum_{t=1}^{L} \sum_n I_{n,t}(j) \cdot W_{n,t}(j) \cdot p_{n,t}(i,j)]_{t=1}^{N}$.
19 return $\{(ID_{c,j}, ID^*(j))\}_{j=1}^{N_S}, \{p_j\}_{j=1}^{N_S}$

APPARATUS, METHOD AND SYSTEM FOR PERSON DETECTION AND IDENTIFICATION UTILIZING WIRELESS SIGNALS AND IMAGES

STATEMENT REGARDING FEDERALLY SPONSORED RESEARCH

This invention was made with government support under grant number NSF CNS-1553273, awarded by the National Science Foundation. The government may have certain rights to this invention.

CROSS-REFERENCE TO RELATED APPLICATION

This application claims the benefit of U.S. Provisional Application No. 63/147,966, filed Feb. 10, 2021, the content of which is incorporated herein by reference in its entirety.

TECHNICAL FIELD

The present disclosure relates to detecting and identifying a person based on wireless signals and camera images.

BACKGROUND

Retail stores, airports, convention centers, and smart areas/neighborhoods may monitor persons in the vicinity. Detection, tracking, and pseudo identification of persons may have various use cases in different applications. In many applications, cameras may be used to track people. Retail stores, for instance, may have cameras mounted in the ceiling looking downward and lack the ability to accurately identify people using facial recognition algorithms. Furthermore, facial recognition algorithms may not perform well in places where thousands of people may be located (e.g., an airport or a large retail store).

SUMMARY

According to an embodiment, A method of identifying a person utilizing a camera and a wireless transceiver includes: receiving, at the wireless transceiver, packets from one or more mobile devices associated with one or more persons in a vicinity of the wireless transceiver; determining channel state information (CSI) data based on a signal associated with the packets; determining first motion characteristics associated with the one or more persons based on the CSI data; receive image data associated with images generated from the camera, wherein the image data is associated with the one or more persons in the vicinity; determining second motion characteristics associated with the one or more persons based on the image data; matching the first motion characteristics with the second motion characteristics to derive matched motion characteristics; assigning weights to the matched motion characteristics, wherein the weights are based on the second motion characteristics determined based on the image data; and identifying the one or more persons based on the matched motion characteristics and the weights.

According to another embodiment, a method of identifying a person utilizing a camera and a wireless transceiver includes: determining channel state information (CSI) data received at the wireless transceiver based on a signal associated with the packets from one or more mobile devices associated with one or more persons in a vicinity of the wireless receiver; determining first motion characteristics associated with the one or more persons based on the CSI data; quantifying an uncertainty of the first motion characteristics; receive image data associated with images generated from the camera, wherein the image data is associated with the one or more persons in the vicinity; determining second motion characteristics associated with the one or more persons based on the image data; matching the first motion characteristics with the second motion characteristics based on the quantified uncertainty to derive matched motion characteristics; and identifying the one or more persons based on the matched motion characteristics.

In yet another embodiment, a system for identifying a person utilizing a camera and a wireless transceiver includes: a wireless transceiver configured to receive packets from one or more mobile devices associated with one or more persons in a vicinity of the wireless transceiver; a camera configured to obtain images of the one or more persons in the vicinity; and a processor in communication with the wireless transceiver and the camera, the processor programmed to: determine channel state information (CSI) data based on a signal associated with the packets, determine first motion characteristics associated with the one or more persons based on the CSI data, receive image data associated with the images, determine second motion characteristics associated with the one or more persons based on the image data, match the first motion characteristics with the second motion characteristics to derive matched motion characteristics, assign weights to the matched motion characteristics, wherein the weights are based on the second motion characteristics, and identify the one or more persons based on the matched motion characteristics and the weights.

BRIEF DESCRIPTION OF THE DRAWINGS

FIG. 4 is an algorithm for identifying a person according to an embodiment of this disclosure.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As computer vision and video analytic technologies evolve, various real-time video analytic based mobile applications and services are emerging, such as Agent Vi and i2V. For example, video analytics can identify users who behave suspiciously in public spaces and alert other users around them. However, many of those new applications require a critical step: real-time human identification, which identifies a user's physical ID (e.g., visual ID and location in video) with the mobile device ID (e.g., smartphone MAC address). This allows services to be provided to specific users in the area recognized by the video analytics; it also allows users to be recognized when reliable visual identification cannot be obtained.

Wireless (e.g., Wi-Fi, Bluetooth, ultra-wideband, etc.) and camera infrastructure are widely deployed in public places, and wireless sensing and visual sensing are complementary to each other. Surveillance cameras are usually deployed to oversee a large area in public spaces, which allows high fidelity multi-user tracking and powerful video analytics to detect various activities and events of users. On the other hand, ubiquitous Wi-Fi-enabled devices such as smartphones and smartwatches, offer unique device IDs (e.g., IP address and MAC address), which can be used as a reliable identifier for their users. The wireless signal transmitted by Wi-Fi-enabled devices also contains rich information of their locations and movements. Combining Wi-Fi and camera data together, there is an opportunity to build user-device association because users and their devices have highly correlated information.

Such a system can be used in several application, for example, in personalized public address and behavior understanding of shoppers in retail stores. Current public address mechanisms do not allow sending personalized messages to individuals to respond. For example, in an active shooter scenario, broadcasting an evacuation plan to everyone (including the active shooter) may jeopardize the evacuation plan. When suspicious or malicious behaviors, e.g. active shooting, robbing etc., are detected by surveillance video analytics, user-device association will be helpful to connect to the targeted people around the event via a mobile application, to send personalized alerts and notifications to their phones, so that they can respond to the events, e.g. evacuate, hide, etc, in a timely and organized manner for their safety. In the future, the entire response plan can be automated based on camera and RF data so that people in such a scenario get real-time assistance with appropriate response strategy before the arrival of law enforcement officers. For retail analytics, it may be important to identify shoppers and re-identify them when they revisit stores. Current camera-based solutions for identifying users either use facial recognition that can be very privacy invasive and banned in some places, or uses body appearance information that does not scale with thousands of shoppers and does not work when the shopper revisits the store with a different colored cloths. Existing Wi-Fi based sniffers can determine whether the shopper is within a vicinity of 50-100 meters radius, but cannot determine the exact location of shoppers to capture fine grained shopping behavior. Existing Wi-Fi based localization solutions require installation, coordination, and maintenance of multiple receiving units, which can be expensive.

The teachings of this disclosure can integrate a camera and a multiple-antenna Wi-Fi chipset and can provide the identification capability in a standalone device. Fine-grained shopping behavior can be captured by identifying and re-identifying customers over time as they revisit the stores and offer high level understanding of shoppers' behavior by fusing video analytics (e.g., demographics, gender) along with digital identification markers from wireless signals (e.g., Wi-Fi). This can help store managers to optimize product lines and layout to offer a better shopping experience. It can also be useful to update the price dynamically and to offer discounts/coupons to individuals in their phones based on their interaction with the product (as seen by the camera).

This disclosure provides the ability to (1) leverage heterogeneous features extracted from both Channel State Information (CSI) and visual analytics that represent location, movement, and activity, and (2) use the similarity and consistency of heterogeneous features in both modalities to compute the most likely user-device association. Specifically, a multiple-antenna Wi-Fi receiver, e.g. an Access Point (AP) or a Wi-Fi-enabled camera, records CSI measurements for every packet sent by each user device, and then computes sequences of these features with the CSI data to construct device profiles; whereas the camera conducts video analytics to extract each user's trajectory and activities to generate sequences of corresponding features as user profiles. These two types of profile are then compared to find the most likely associations between each device and its user.

However, such a fusion approach has several major challenges. Although CSI data has rich and high dimensional information, it is significantly affected by multi-path and shadowing effects in time-varying multi-user environments. Moreover, mobile devices usually have variable number of packets sent per second when connected to a Wi-Fi AP, or when the device is trying to discover an AP. Requiring high transmission rate from the phone can make the solution unusable when the phone sends probe packets at around 20 Hz and also have a negative impact on the battery life of the phone. Therefore, the high uncertainty inherent in Wi-Fi data may introduce incorrect associations.

To address these challenges, this disclosure describes an apparatus, system and method that fuses radio frequency (RF) data and camera data for real-time human identification with mobile devices. The inventors have named this an "RFCam." RFCam utilizes rich contextual information captured by visual sensing and wireless sensing modalities and fuses the information analytically with uncertainty-awareness for the device-user association. In embodiments, the system framework has two levels. First, it captures useful features for the identification purpose that can be obtained from both video and CSI data including user's activity, distance, and Angle-of-Arrival (AoA). While there has been a significant amount of work on CSI-based localization and activity recognition, this disclosure describes vision-guided uncertainty estimation of the CSI-based features. When estimating the CSI-based features, high dimensional CSI vectors are transformed to low dimensional feature spaces, which is an important improvement over the hand-crafted, statistical features that are used for similar purposes.

Second, with these features and their uncertainties, this disclosure provides a fusion algorithm to obtain the probability of each user-device association. In embodiments, this algorithm has at least two techniques: (1) it computes the association probability with multiple features and their uncertainties, and (2) it detects important contextual information and uses it to rank the moments for improving the performance of the multimodal fusion.

The systems described herein leverage existing computer vision algorithms for camera calibration, detection, tracking, and localization of individuals using camera images. The disclosed systems may be agnostic about the selection of computer vision algorithms for this purpose, as long as their performances remain similar to the state-of-the-art methods. However, the systems disclosed herein are configured for detecting rich contextual information from the video to enhance the performance of the fusion algorithm. For example, assume a scenario in which two users walk next to each other for a while and then head in different directions. Using the moments after they split and head in different directions are more likely to result in good device-user associations. Such contextual information is used to rank moments and features, and their weights are adjusted accordingly when computing probabilities of associations. Additional disclosure of these concepts is provided below with respect to the Figures.

This disclosure can be implemented into an end-to-end system using multiple models of smartphones, an off-the-shelf panoramic camera, and a multiple-antenna Wi-Fi chipset. A desktop can run as a cloud server to process the computation of RFCam.

In embodiments described herein, the disclosed system automatically identifies users that carry Wi-Fi-enabled devices using a camera and a multiple-antenna Wi-Fi receiver. This can use fine-grained motion and location features derived from Wi-Fi CSI data to associate Wi-Fi devices with their users captured through a camera on a stand-alone device.

In embodiments described herein, the disclosed system has an uncertainty-aware fusion framework with multiple techniques: (1) vision-guided uncertainty estimation techniques for CSI-based features; (2) computation of the association probability with multiple features and their uncertainties; (3) a fusion algorithm that uses important contextual information detected from the video to rank moments and features, and adjust their weights accordingly to compute probabilities of associations.

Figure 1:
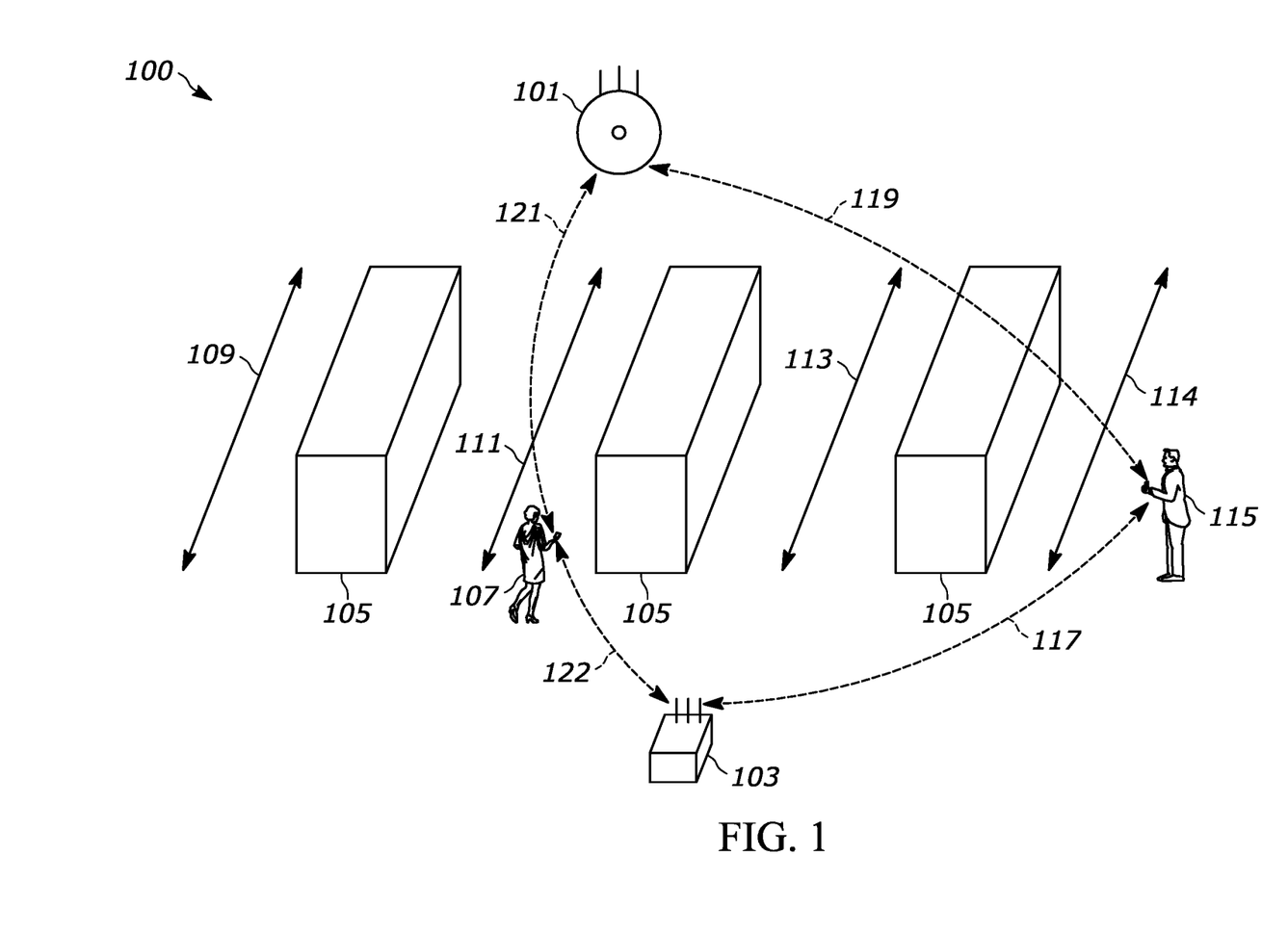
FIG. 1 is an overview system diagram of a system for detecting and identifying a person based on wireless signals and camera images, according to an embodiment of the disclosure.

Turning now to the Figures, FIG. 1 is an overview system diagram of a wireless system 100 according to an embodiment of the disclosure. The wireless system 100 may include a wireless unit 101 utilized to generate and communicate channel state information (CSI) data. The wireless unit 101 may communicate with mobile devices (e.g. cell phone, wearable device, smart watch, tablet, etc.) of an employee 115 or a customer 107. For example, a mobile device of an employee 115 may send wireless signals 119 to the wireless unit 101. Upon reception of a wireless packet, the wireless unit 101 obtains or determines the associated CSI values of packet reception. Also, the wireless packet may contain identifiable information about the device ID, e.g., MAC address that is used to identify employee 115. Thus, the system 100 and wireless unit 101 may not utilize the data exchanged from the device of the employee 115 to determine various hot spots.

While Wi-Fi may be utilized as a wireless communication technology, any other type of wireless technology may be utilized. For example, Bluetooth may be utilized if the system can obtain CSI from a wireless chipset. In other embodiments, ultra-wideband may be utilized if the system can obtain or derive CSI from an associated wireless chipset in the wireless unit 101. In short, while certain descriptions provided herein focus on the wireless unit 101 being a Wi-Fi transceiver, the wireless unit may also be a Bluetooth transceiver, UWB transceiver, or other similar transceiver capable of generating or determining CSI information from packets received wirelessly from an associated device. The present disclosure should not be limited to only performing the wireless transmission of packet data via Wi-Fi.

In embodiments, the wireless unit 101 may be able to contain a Wi-Fi chipset that is attached to up to three antennas, as shown by wireless unit 101 and wireless unit 103. A system unit may include a receiving station that contains a Wi-Fi chipset that includes up to three antennas in one embodiment. The system unit can be mounted at an arbitrary height or at a ceiling. A chipset that utilizes CSI information may be utilized in another embodiment. The wireless unit 101 may include a camera to monitor various people walking around a point of interest or detectable vicinity. In another example, the wireless unit 103 may not include a camera and simply communicate with the mobile devices.

The wireless unit 101 may contain one or more processors configured to perform the methods described herein. The processor(s) may be in communication with memory that, when executed by the processor(s), causes the processor(s) to perform the disclosed methods. It should be understood that the processor(s) need not physically be in the wireless unit 101, but instead may be otherwise connected to the wireless transceiver and camera (e.g., in a backend computer system) to perform the disclosed functions. In one embodiment, a dedicated one or more processor is configured to process the wireless packet data, and another dedicated one or more processor is configured to process the image data. These processors, or additional processors, can be configured to perform the feature matching, feature fusion, and user-device associations described below.

The system 100 may cover various aisles, such as aisles 109, 111, 113, 114. The aisles may be defined as a walking path between shelving 105 or walls of a store front. The data collected between the various aisles 109, 111, 113, 114 may be utilized to generate a heat map and focus on traffic of a store. The system may analyze the data from all aisles and utilize that data to identify traffic of other areas of the store. For example, data collected from the mobile device of various customers 107 may identify areas that the store receive high traffic. That data can be used to place certain products. By utilizing the data, a store manager can determine where the high-traffic real estate is located versus low-traffic real estate. In addition, by fusing pseudo-identification information using wireless data with camera based analytics (e.g., gender, age range, ethnicity), the system can build profiles of individual customers and customer specific analytics for individual aisles. Also, by capturing the entire journey of individual customers, the system can provide store-wide customer specific analytics. For example, the system can monitor a customer and develop corresponding data regarding the time spent by that customer in particular areas of the store so that the store can better deliver targeted advertisements, coupons, and the like.

The CSI data may be communicated in packets found in wireless signals. In one example, a wireless signal 121 may be generated by a customer 107 and their associated mobile device. As will be described in more detail below, the system 100 may utilize the various information found in the wireless signal 121 to determine various heterogeneous features, such as angle of arrival (AoA), distance, and activity such as movement, and the like. The customer 107 may also communicate with the wireless unit 103 via signal 122. Furthermore, the packet data found in the wireless signal 121 may communicate with both wireless unit 101 or unit 103. The packet data in the wireless signal 121, 119, and 117 may be utilized to provide information related to motion trajectory and traffic data related to mobile devices of employees/customers.

Figure 2:
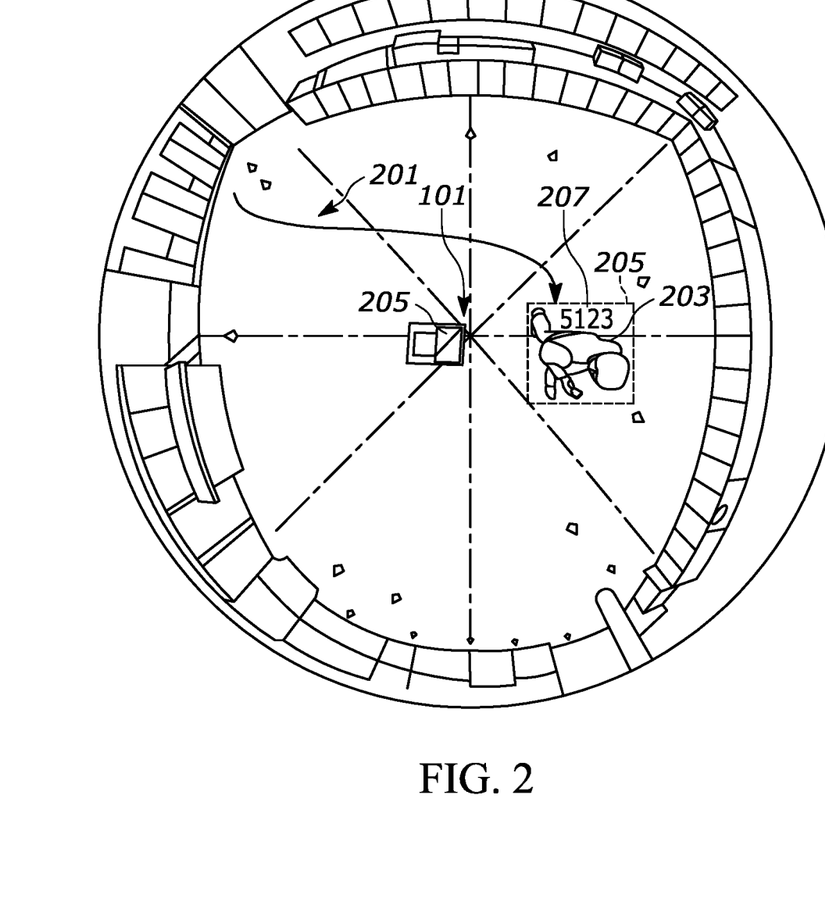
FIG. 2 is an exemplary image of the image data collected in a camera according to an embodiment in this disclosure.

FIG. 2 is an exemplary image of the image data collected by a camera according to an embodiment in this disclosure. The camera in FIG. 2 may be mounted in a wireless unit 101 in the ceiling, as shown by the illustrated image data. In other embodiments, the wireless unit 101 and contained camera may be mounted anywhere else, such as a shelf or a wall. The motion trajectory 201 of a person 203 is shown and can be determined according to the various embodiments disclosed below. The image data that is captured by the camera may be utilized to collect information regarding a person (e.g. customer or employee, gender, age range, ethnicity, AoA, distance, activity) moving around certain space. The camera may add a boundary box 205 around a person. The camera may detect humans using object detection techniques, such as YOLO, SSD, Faster RCNN, etc. The bounding box may identify a boundary around a person or object that may be displayed on a graphical image to identify the person or object. The bounding boxes may be tracked utilizing Optical Flow, Mean-Shift Tracking, Kalman filter, particle filter, or other type of mechanism. The tracking may be estimated by analyzing the position of a person over any given length of time. Furthermore, an identification number 207 (in this case, ID number 5123) may be assigned to a person identified utilizing the various techniques explained further below.

Figure 3:
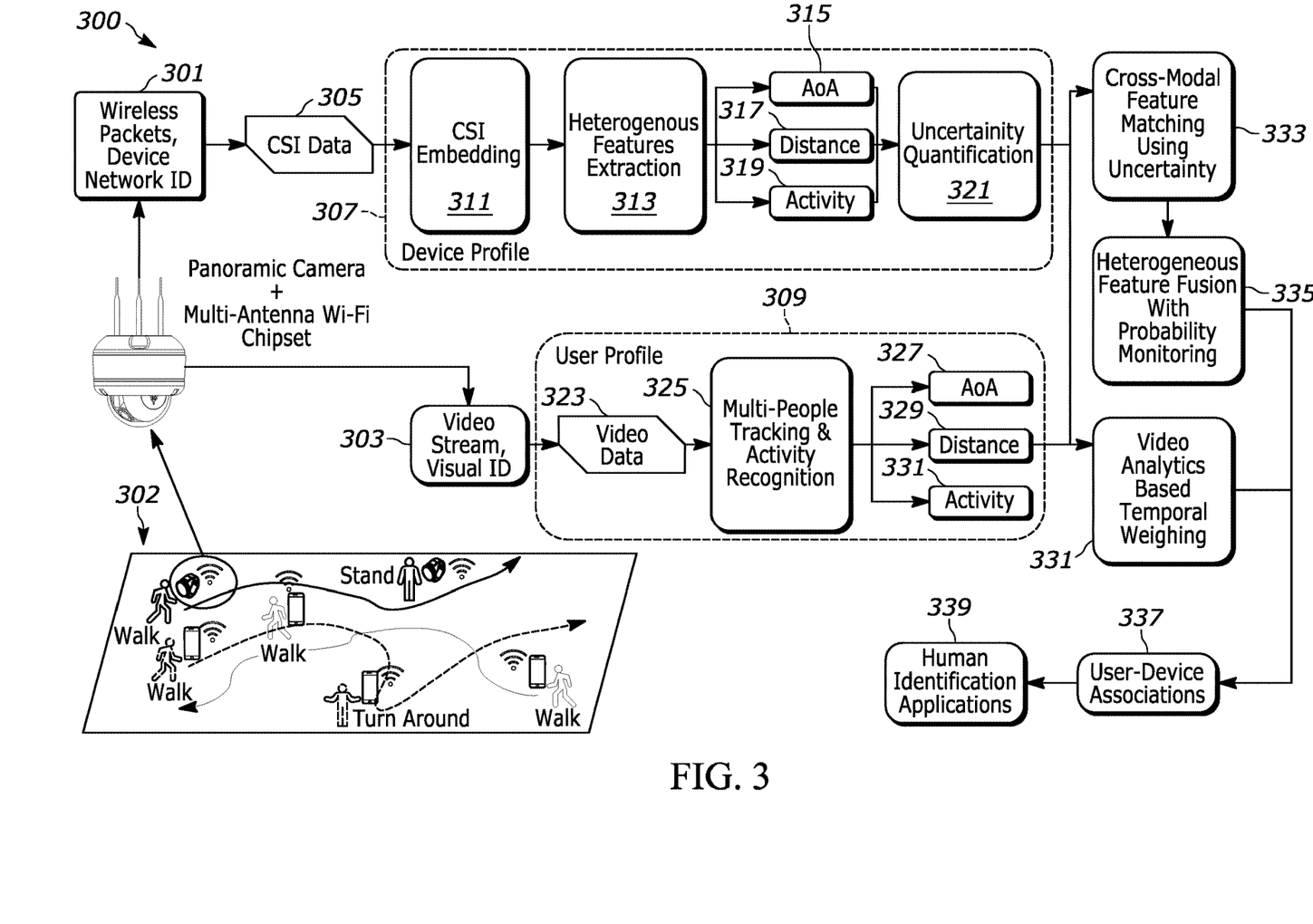
FIG. 3 is a flow chart and system overview of a system for detecting and identifying a person based on wireless signals and camera images, according to an embodiment of the disclosure.

FIG. 3 is an overview of a system 300 for detecting and identifying a person based on wireless data and camera data. As will be described, wireless (e.g., Wi-Fi) packets are captured along with device network IDs. The CSI values corresponding to each received packet are extracted from each antenna attached to the wireless receiver. Heterogeneous features (e.g., AoA, distance, activities) are estimated with uncertainty quantification to form device profiles. Videos are streamed in a panoramic camera (or other type of camera) with visual ID of all users. The same heterogeneous features (e.g., AoA, distance, activities) are captured to form user profiles. A smart fusion and matching algorithm uses uncertainty and video analytics to decide the probabilities of user-device associations, and uses video analytics-based temporal weighing to find contextual important moments. The association results can be used for potential human identification applications.

The system of FIG. 3 includes two major components: a dual-modality profile estimation component, and the uncertainty-aware human identification component. The system setting includes (1) a camera and a multiple-antenna wireless receiver are deployed in an area, where multiple users move freely without pre-defined patterns. The users can carry Wi-Fi-enabled devices that transmit Wi-Fi packets at a low frequency (e.g., probe frequency around 20 Hz when smartphones receive notifications) with device network IDs. The CSI data and device network IDs of each packet received by the Wi-Fi antenna are used to compute device profiles. Video captured by the camera is streamed to the cloud and used to compute user profiles based on visual features. The system outputs user-device association (i.e., device-visual ID pairs) by fusing CSI and video data. The association results could be used in the applications mentioned in the Introduction section.

It may be challenging to achieve a robust, real-time human identification solution only using a single video camera, a single Wi-Fi radio with multiple antennas with low sampling frequency CSI data in a multi-person and dynamic environment.

CSI data can be high-dimensional and extremely noisy due to environmental variations. In addition, user's mobile devices (e.g., smartphones, smartwatches) may have low sampling frequency Wi-Fi traffic, e.g., 20-50 Hz based on device settings, application demand, and energy management. This results in high uncertainty in device information estimation because of the lack of precise radio propagation modeling in the multi-user, dynamic environments.

Moreover, the difference of fidelity in visual and wireless sensing makes cross-modal data matching difficult. The low fidelity, thus high uncertainty in wireless sensing modality could cause huge amounts of error, especially in dynamic multi-user environments. Meanwhile, constant cross-modal matching and data fusion may cause large overhead for real-time human identification systems.

At 301, a wireless unit (e.g., wireless unit 101, wireless transceiver within system 100, etc.) receives wireless packets from mobile devices of one or more persons in the vicinity 302 of the wireless transceiver. The wireless packets may also contain device network identification, MAC address information, or other wireless information. Meanwhile, at 303, a camera associated with (e.g., within, connected to, etc.) the wireless unit generates image data, which can be in the form of a video stream for example. A processor associated with the wireless unit can perform visual identification of detected persons as described herein.

Referring first to the use of wireless data, at 305 a transceiver, or processor associated with the wireless unit 101, determines CSI data associated with the wireless packets; the transceiver or associated processor determines or generates the known channel properties of the communication link between the mobile device and the transceiver. This can be performed for every mobile device in the vicinity such that a device profile 307 can be built for every mobile device. Meanwhile, the system builds a user profile 309 associated with every detected person in the image data from 303. The various device profiles 307 and user profiles 309 are associated based on uncertainties, probabilities, and/or weights as described further herein.

The system defines the one or more device profiles 307 as a set of information for a device, $(ID_{c,j}, \theta_{c,t,j}, d_{c,t,j}, a_{c,t,j})$ where $ID_{c,j}$ is the device ID, and $\theta_{c,t,j}$, $d_{c,t,j}$ and $a_{c,t,j}$ are Angle of Arrival (AoA), distance, and macro movements (described further below) of device j at timestamp t derived from CSI data.

The system defines the one or more user profiles 309 as a set of information for a user obtained from vision-based human detection algorithms, $(ID_{v,i}, x_{v,t,i}, y_{v,t,i}, a_{v,t,i})$ where $ID_{v,i}$ is the visual ID, $(x_{v,t,i}, y_{v,t,i})$ are the coordinates, and $a_{v,t,i}$ is the activity recognition result of user i at timestamp t in the video stream or image data. The device and user IDs can be invariant during the identification.

To better utilize noisy and high dimensional CSI data, embedding 311 in neural networks for dimensional reduction and feature extraction 313 (described further below). For each feature, different techniques are developed to quantify its uncertainty, such as: (1) a recurrent neural network (RNN) with Bayesian belief network and Monte-Carlo sampling to predict and quantify the uncertainty of the AoA 315 of the mobile devices; (2) A convolutional neural network (CNN) to transform CSI amplitude data using embedding and then use similar framework to predict and quantify uncertainty of distance 317 of devices; and (3) an encoder-decoder classifier with embedding and attention models to perform activity recognition 319. Each of these are further described below, and are examples of methods of determining AoA, distance, and activity of the devices. AoA, distance, and activity may all be referred to as motion characteristics; packets are sent over time, and the change in the CSI data received from these packets indicates a change in motion (or lack of change, such as standing still).

As described further herein, these device features can be trained and calibrated with labels automatically generated from existing advanced multi-user tracking video analytics approaches. In the uncertainty-aware human identification, the system defines similarity scores between user and device profiles, and matching probability to assign probabilities to all user-device pairs. A heterogeneous feature fusion framework is proposed to use all features over time and find the most likely user-device associations. The system monitors the probabilities of each user-device pair and filters out ones with constant low probabilities. In an environment where multiple users are moving freely, it may be common that a few users are at close locations or having the same macro movement at some moments. So, in addition, video analytics can identify such contextual information and assign different weighs to moments where accurate matching is more likely. For example, the moment two people split up and go in separate directions, or the moment one person changes direction or trajectory, can be given more weight. Using these mechanisms, the system includes a real-time algorithm that makes it possible for robust user-device association with low latency.

In the following disclosure below, subscript c indicates CSI-based data; v indicates vision-based data; t represents the variable is collected or computed at time t; i indicates data for user i; and θ, d, a represent AoA, distance, and activity, respectively.

Now, a description is provided of the AoA feature in the wireless unit along with vision-assisted calibration and Bayesian inference to improve the device AoA estimation. Existing methods such as SpotFi extend classical MUSIC algorithm to calculate the AoA of received wireless (e.g., Wi-Fi) signals using phase differences between antennas. The system 300 first uses SpotFi to compute device AoA, then use a smoothing pipeline to smooth this SpotFi-based AoA. The AoA results after smoothing are still noisy and prone to error, especially when AoA are large (e.g., 50°-90°). To leverage videos to assist AoA estimates, the system calibrates AoA using visual sensing as ground truth labels to mitigate these errors. To do that, the system trains a single-input, single-output Long-short Term Memory (LSTM) network that takes smoothed SpotFi-based AoA as training inputs, and the vision-based AoA estimates as labels. This network is denoted as the Calibrated NN-based AoA estimator. A recurrent neural network can be utilized because successive AoA of the same user has underlying temporal dependencies and constraints. It can contain three LSTM layers with 200 hidden units, each followed by a dropout layer (p=0.2), and then a fully connected layer, a parametric ReLU layer, and a regression layer. Furthermore, the uncertainty of device AoA is quantified at 321 by applying Bayesian belief network transform and Monte-Carlo sampling upon our trained Calibrated NN-based AoA estimator to quantify both data and model uncertainty.

In order to do so, first the Calibrated NN-based AoA estimator is transformed into a Bayesian belief network, then an ensemble of M such networks is used, created by enabling dropout at test time. At time t, to estimate device AoA and its uncertainty, we input the smoothed SpotFi-based AoA to all M networks and get M outputs $\{\mu_i, v_i\}_{i=1}^M$. We compute the prediction by averaging all the output predictions $$\theta_{c,t} = \bar{\mu} = \frac{1}{M} \cdot \sum_i^M \mu_i;$$

and the variance $$\sigma_t^2(\theta) = \frac{1}{M} \cdot \sum_i^M v_i + (\mu_i - \bar{\mu})^2.$$

To compute the prediction accuracy, given a quantile θ, the likelihood that the actual device AoA, $\hat{\theta}_{c,t}$, is between $\theta_{c,t}$ and θ is computed by:

$$P_1(\theta, \theta_{c,t}, \sigma_t^2) = \begin{cases} P(\theta_{c,t} \leq \hat{\theta}_{c,t} \leq \theta), & \text{if } \theta \geq \theta_{c,t} \\ P(\theta \leq \hat{\theta}_{c,t} \leq \theta_{c,t}), & \text{otherwise} \end{cases} = \left| \frac{1}{2} - P\left(z < \frac{\theta - \theta_{c,t}}{\sigma_t}\right) \right|$$

$$= \left| \frac{1}{2} - \Phi\left(\frac{\theta - \theta_{c,t}}{\sigma_t}\right) \right|$$

where $(\theta - \theta_{c,t})/\sigma_t$ is the z-score (i.e., standard score) of θ under distribution $N(\theta_{c,t}, \sigma_t^2)$ and the probability $P(z < (\theta - \theta_{c,t})/\sigma_t)$ is found on the z-table (i.e., standard normal table) which gives the probability that a statistic is observed below values on the standard normal distribution, given by its cumulative distribution function (CDF), $\Phi(\cdot)$. The rate of change of mean device AoA is estimated by locally fitting a cubic function and calculate its derivative at time t, which is denoted $\theta'_{c,t}$. The Calibrated NN-based AoA estimator successfully mitigate overestimates (e.g., around 200-400 packets) and underestimates (e.g., around 650-750 packets) of the SpotFi-based AoA estimates.

Regarding the feature extraction at 313, CSI data can use hand-crafted features to describe characteristics of CSI data. However, these methods usually only consider specific high-frequency temporal information with the need of high expertise and labor. Here, according to an embodiment, the system 300 transforms the high-dimensional CSI data to a low dimensional feature space so that data from devices with similar classes (e.g., transmission distance, device activity) are mapped in a cluster and different classes separated in that space. A feature extractor (e.g., machine-learning model) is used as a backbone to extract feature representations from CSI amplitude data in a single wireless packet from the wireless receiver. The input of the extractor is changed from a sequence of CSI data to a single CSI data because some classification needs only one packet. A 9×1 1-D convolutional layer can be used as the first layer, a 5×1 max pooling, and a 3×1 average pooling layers. Another residual block can also be added with a stride of 3. The dimension of output can be set to 32. Different architectures were tested and they provide the highest accuracy for the tasks involved including distance estimation and activity recognition. This can be referred to as embedding CSI2Vec and can be used in distance estimation and activity recognition for estimating device profile in the following disclosure.

Regarding distance estimation 317 and its associated uncertainty quantifications, here, to estimate the distance feature in device profile, the system uses the CSI2Vec to create an embedding to translate CSI amplitude data to a vector space where packets transmitted from similar distances will be close together. A user distance estimator is designed using a simple convolutional neural network (CNN). The network takes as inputs the single CSI amplitude data and outputs the distance estimates between the wireless receiver and the mobile devices. The input CSI data are put into a CSI2Vec embedding layer with output size of 32 (for example), followed by a 1-D convolutional layer with filter number of 16, and kernel size of 3×1, according to an embodiment. The network can then connects to three fully connected layers with ReLU activation functions of output size of 128, 64, and 1, respectively. Each fully connected layer follows a dropout layer (p=0.2) for avoiding overfitting. Hyper-parameter tuning can be used to find the best hyper-parameter combination.

The uncertainty in device distance estimation is then quantified in the same framework to that for device AoA, at 321, based on Bayesian belief network transform and Monte-Carlo sampling. At time t, an ensemble of networks is used to compute a prediction for device distance $d_{c,t}$, and its variance $\sigma_t^2(d)$. Followed by similar derivation of Equation 1 (above), the likelihood that the actual device distance, $\hat{d}_{c,t}$, is between $d_{c,t}$ and any given estimate d is:

$$P_2(d, d_{c,t}, \sigma_t^2) = \left| \frac{1}{2} - \Phi\left(\frac{d - d_{c,t}}{\sigma_t}\right) \right|$$

The rate of change of device distance is also estimated by locally fitting a cubic function and calculate its derivative at time t, which is denoted as $d'_{c,t}$.

Regarding activation recognition and its uncertainties quantification, according to one embodiment, the system uses a LSTM-based classifier, specifically, an encoder-decoder approach to recognize human activity using CSI data series. The model is designed with attention models and CSI2Vec embedding. Due to the low sampling frequency of the packets, activities require high frequency analysis (e.g., gait) may not be appropriate in this setting. Thus, a disclosed embodiment of the system may instead focus on three activities that are more robust to low sampling frequency: walking, standing, and turning around. These may be referred to as motion characteristics. This network may be used because: (1) temporal patterns in successive CSI data contain information of user activity, and the classifier should capture those patterns. So, an encoder-decoder architecture using LSTM networks is configured to capture temporal patterns, and temporal attention models to highlight important CSI components; (2) the attention mechanism is integrated with embedding to capture important output dimensions in the embedding.

The encoder can be a standard LSTM with, for example, 200 hidden units and hidden states $h_t$ at time t. The input of the encoder-decoder network is the CSI amplitude data. The decoder network has a similar architecture with hidden state $s_t = f(s_t-1, y_t-1, H_t)$, where $y_t-1$ is the decoder output at time t−1, and $H_t$ is the context vector, which is a weighted sum of all encoder hidden states $H_y = \Sigma_{i=1}^T w_{t,i} h_i$, and $w_{t,i} = e^{score(s_t-1, h_t)} / \Sigma_{i'=1}^T e^{score(s_t-1, h_{t'})}$ where function score $(s_t, h_t) = v_w^T \tanh(W_s s_t + W_h h_t)$. Both v's and W's are the learnable parameters of the temporal attention model. To better capture important dimensions in the embedding, we propose an attention mechanism after the embedding layers. At time t, the attention weight vector $g_t$ has the dimension of the embedding, and it depends on the previous vector $e_{t-1}$ and the current input $C'_t$. The embedding attention model is described by $g_t = v_g^T \tanh(W_e e_{t-1} + W_c C'_t)$ and $$e_t = e^{g_t} / \sum_{i=1}^{S \cdot K} e^{g_t^i},$$

where both v's and W's are the learnable parameters of the embedding attention model. Hyper-parameter tuning can be used to find the best hyper-parameter combination. In an embodiment, the classifier quantifies the uncertainty of the classification at 321 in the form of classification probability distribution over activity classes from the output of the softmax layer.

Now, the high-fidelity detection and tracking of users with visual sensing will be described, along with the derivation of heterogeneous feature to form user profiles 309. The description provided is, of course, according to embodiments.

First, heterogeneous feature estimation is described using image data (e.g., video data) 323 determined form the raw images or video from 303. As video analytic algorithms become sophisticated, they can perform multiple user detection and tracking using a video stream with high accuracy, and therefore infer each user's location coordinates in real-time, especially in an indoor environment under good lighting conditions. In the systems disclosed herein, a basic multi-user tracking algorithm is utilized at 325 according to an embodiment: first, foreground and background are detected and separated, and then foreground is segmented and people are tracked in the foreground using a modified version of Lucas-Kanade optical flow algorithm, for example. The system can use OpenPose to detect and track the locations of the center of the feet of the users and extract the coordinates of those locations of all N users, denoted as $\{(x_{v,t,i}, y_{v,t,i})\}_{i=1}^N$, with user IDs (i.e., $\{ID_{v,i}\}_{i=1}^N$). The coordinates are automatically extracted and recorded with timestamps t. The system uses a calibration algorithm during camera installation in order to map the pixels seen in the camera to the distance from the camera. For panoramic cameras, to fix the distorted images, image rectification can be used before applying human detection algorithms. At runtime, the video can be streamed to system from 303, then image rectification is used for removing distortions, and user coordinates are computed with timestamps and user IDs. With this recorded coordinates, the system at 327 can compute the AoA of user i using the following.

$$\theta_{v,t,i} = \tan^{-1}\left(\frac{y_{v,t,i} - y_{ref}}{x_{v,t,i} - x_{ref}}\right)$$

The system at 329 can also determine distance estimates in reference to the camera:

$$d_{v,t,i} = ((x_{v,t,i} - x_{ref})^2 + (y_{v,t,i} - y_{ref})^2)^{1/2}$$

where $(x_{ref}, y_{ref})$ are the coordinates of the camera. Their derivatives are computed using successive coordinates.

As to activity recognition at 325, the system can use basic types of activities: walking, standing, and turning, which are relatively easy to be recognized using the spatio-temporal features of the motion trajectory. For complex activities, other approaches can model the body joints of human posture and concatenate the features from the motion sequence with respect to time in a 3-D space-time volume, which is used for classification of action/activity of the person using a classifier, e.g., k-NN. Other state of the art computer vision algorithms can also be applied to estimate these activity features reliably. The result is a determination or estimation of user activity at 331.

Next, at 331, the system can rely on a temporal weighing module which uses video analytics to identify the key or important moments where the system can achieve more accurate human identification. The intuition is that in user-device association tasks, moments are not equally important and their relative importance varies depending on the video context. For example, at one moment, two users, one of which carries a device, is walking with largely distinct AoA values and rates of change. This is a great moment to decide who carries the device because it is less likely to make a mistake, so the system should assign a larger weight to this moment more than those times when users have similar AoA values or rates of change. Since the user profile is more accurate, the system can use the divergence of user AoAs around the device AoA to determine the importance of that moment. In similar principles, different importance can be assigned to distance and activity recognition. Consequently, the significance of the moments on feature η to find the user for device j can be defined using the following equation:

$$W_{\eta,t}(j) = \begin{cases} \mathrm{Var}\left(\{\theta\}_{k=1}^{K}\right) \cdot \mathrm{Var}\left(\{\theta'_k\}_{k=1}^{K}\right), & \text{if } \eta = \theta \\ \mathrm{Var}\left(\{d_k\}_{k=1}^{K}\right) \cdot \mathrm{Var}\left(\{d'_k\}_{k=1}^{K}\right), & \text{if } \eta = d \\ \mathrm{Var}\left(\{a_k\}_{k=1}^{K}\right), & \text{if } \eta = a \end{cases}$$

where $\eta \in \{\theta, d, a\}$ amd $\mathrm{Var}(\cdot)$ is the variance. Element $\theta_k$ is the k-th smallest AoA absolute differences between all user predictions and the device prediction, $\{|\theta_{c,t,i} - \theta_{v,t,j}|\}_{i=1}^{N}$. Similarly, $\theta'_k$, $d_k$, $d'_k$, and $a_k$ are the k-th smallest absolute difference of AoA rate of change, distance, distance rate of change, and activity recognition probability, respectively. Finally, the significance factors are normalized onto interval (0, 1). As a result, the system only consider K users whose user profiles are the most similar to the target device profile because their user profile divergence is the key to determines the importance of that moment.

Figure 5:
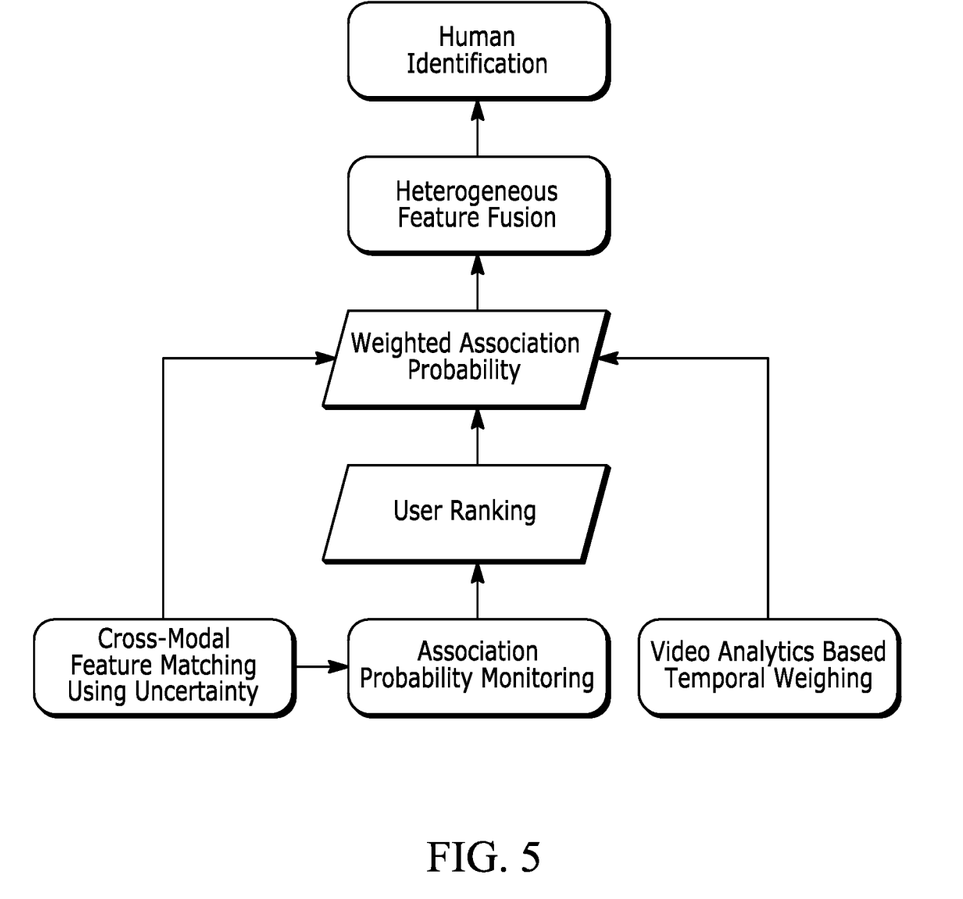
FIG. 5 is a flow chart of an algorithm for identifying a person according to an embodiment of this disclosure.

Now a description of how the system 300 uses the device profile 307 and user profile 309 for uncertainty-aware human identification. FIG. 5 is an illustration of the human identification algorithm, according to an embodiment. As will be described, both device and user profiles are used in crossmodal feature matching module using uncertainty for profile matching. The output user-device associations are then used in heterogeneous feature fusion module with video analytics that includes an association probability monitoring method. The temporal weighing module to find important fusion moments (described above) provides significance to the matching. All of the above results are used collectively to make a final human identification decision.

First, at 333, the system is configured to perform cross-modal feature matching using uncertainty. First, the process of cross-modal feature matching for each profile feature (e.g., AoA, distance, activity) is described. For each user i=1, . . . , N, at time t, the system 300 has the user file from vision module: $\mathrm{ID}_{v,i}, x_{v,t,i}, y_{v,t,i}, a_{v,t,i}$. Then the system uses it to compute $\theta_{v,t,i}, d_{v,t,i}$ and their derivatives $\theta'_{v,t,i}, d'_{v,t,i}$ from the user profile. Multi-class classification result is a vector of probabilities for M activity classes $A_{v,t,i} = [a_{v,t,i}^1, \ldots, a_{v,t,i}^M]$. For each device j=1, . . . , $N_s$, the system has the device profiles: $(\mathrm{ID}_{c,j}, \theta_{c,t,j}, d_{c,t,j}, a_{c,t,j})$, derivatives $\theta'_{c,t}$ and $d'_{c,t}$, and prediction variances $\sigma_t^2(\theta)$ and $\sigma_t^2(d)$. Multi-class classification result is $A_{c,t,j} = [a_{c,t,j}^1, \ldots, a_{c,t,j}^M]$.

Then, a description of defined similarity scores of the three features between user i and device j:

$$\phi_{\eta,t}(i,j) = \begin{cases} \left(P_1(\theta_{v,t,i}, \theta_{c,t,j}, \sigma_t^2) + |\theta'_{v,t,i} - \theta'_{c,t,j}|\right)^{-1}, & \text{if } \eta = \theta \\ \left(P_2(d_{v,t,i}, d_{c,t,j}, \sigma_t^2) + |d'_{v,t,i} - d'_{c,t,j}|\right)^{-1}, & \text{if } \eta = d \\ \left(-\sum_{m=1}^{M} a_{v,t,i}^j \log(a_{c,t,j}^m)\right)^{-1}, & \text{if } \eta = a \end{cases}$$

where $W_1$ is the 1-st Wasserstein distance function assuming distance distribution is Gaussian. Functions $P_1$ and $P_2$ are defined in Equations (1) and (2) above, respectively. The inverse of categorical cross-entropy loss is used as the activity similarity score function. Essentially, similarity score $\phi_{\eta,t}$ represents the level of similarity between features from two profiles and is larger when two profiles are more alike. For instance, $\phi_{\theta,t}$ is larger when user profile has closer AoA prediction to device profile, as well as similar AoA rate of changes. Rate of change can also be important in matching of temporal trajectories.

Then, a matching probability matrix, $P_{\eta,t} \in R^{N \times N_s}$, is defined for all N users and all $N_s$ devices, using the following equation:

$$P_{\eta,t} = \begin{bmatrix} P_{\eta,t}(1,1) & \cdots & P_{\eta,t}(N,1) \\ \vdots & \ddots & \\ P_{\eta,t}(1,N_s) & \cdots & P_{\eta,t}(N,N_s) \end{bmatrix} = \tag{3}$$

$$\begin{bmatrix} \dfrac{e^{\phi_{\eta,t}(1,1)}}{\sum_{i=1}^{N} e^{\phi_{\eta,t}(i,1)}} & \cdots & \dfrac{e^{\phi_{\eta,t}(N,1)}}{\sum_{i=1}^{N} e^{\phi_{\eta,t}(i,1)}} \\ \vdots & \ddots & \\ \dfrac{e^{\phi_{\eta,t}(1,N_s)}}{\sum_{i=1}^{N} e^{\phi_{\eta,t}(i,N_s)}} & \cdots & \dfrac{e^{\phi_{\eta,t}(N,N_s)}}{\sum_{i=1}^{N} e^{\phi_{\eta,t}(i,N_s)}} \end{bmatrix}$$

where $P_{\eta,t}(i,j)$ represent the matching probability between user i and device j based on feature η. The rows represent user-device association probability distributions for each device and the columns for each user. The normalized exponential function in the matrix maps $\phi_{\eta,t}(i,j)$ monotonically onto interval (0, 1) with $\Sigma_{i=1}^{N} P_{\eta,t}(i,j) = 1$. Note that $\Sigma_{j=1}^{N_s} P_{\eta,t}(i,j) \neq 1$ because one user could carry multiple devices.

At 335, the system is configured to perform heterogeneous feature fusion with probability monitoring. The idea of heterogeneous feature fusion is that, over time, the device profile should best match the user profile of the device user. However, device profile estimation is under high uncertainty and some matches identify incorrect users, so the correct matches are included and the incorrect ones are excluded. Leveraging the concept of significance, in a window of L packets, the system selectively fuses those with high matching probability or large significance with a condition $\zeta_{\eta,t}(j) = \{\max(P_{\eta,t}(1,j), \ldots, P_{\eta,t}(N,j)) \geq P_{th} \lor W_{\eta,t}(j) \geq W_{th}\}$ to determine whether feature η at time t should be fused or not. Parameters $P_{th}$ and $W_{th}$ are pre-defined thresholds, and $\lor$ is the disjunction operator. Using the condition and significance, a weighted association probability matrix is defined for each heterogeneous feature, denoted as $P_\eta = [P_{\eta,1}, \ldots, P_{\eta,L}] \in R^{N \times N_s \times L}$, given by:

$$P_{\eta,t} = \begin{bmatrix} I_{\eta,t}(1) \cdot W_{\eta,t}(1) \cdot P_{\eta,t}(1,1) & \cdots & I_{\eta,t}(1) \cdot W_{\eta,t}(1) \cdot P_{\eta,t}(N,1) \\ \vdots & \ddots & \\ I_{\eta,t}(N_s) \cdot W_{\eta,t}(N_s) \cdot P_{\eta,t}(1,N_s) & \cdots & I_{\eta,t}(N_s) \cdot W_{\eta,t}(N_s) \cdot P_{\eta,t}(N,N_s) \end{bmatrix} \quad (4)$$

where $I_{\eta,t}(j)$, $j=1 \ldots, N_s$ are binary indicators of $\zeta_{\eta,t}(j)$ is satisfied. The thresholds can be tuned to the optimal values to achieve the system's best overall performance.

The system then proceeds to use all the weighted association probability for all features in the whole window to find the estimated user ID of devices j, denoted as $ID^*(j)=ID_{v,i^*}$, by finding the user with the largest probability:

$$i^* = _{i \in 1, \ldots, N}{}^{argmax} \Sigma_{t=1}^{L} \Sigma_\eta I_{\eta,t}(j) \cdot W_{\eta,t}(j) \cdot P_{\eta,t}(i,j) \quad (5)$$

where i*-th user is estimated to be associated to device j. The probability of this association, $p_j$, is the i*-th element of the normalized exponential function of $[\Sigma_{t=1}^{L} \Sigma_\eta I_{\eta,t}(j) \cdot W_{\eta,t}(j) \cdot P_{\eta,t}(i,j)]_{i=1}^{N}$.

The system can also use a user-device association probability monitoring module at 337 to rank users regarding their probabilities for carrying the device. In an embodiment, the system only considers associations that has prolonged high probabilities as candidates. In a window of L packets, the system excludes the candidacy of a user as the carrier of device j if any feature matching probability (i.e., $P_{\eta,t}(i,j)$) is among the $K_e$ smallest in all user probabilities (i.e., $\{P_{\eta,t}(i,j)\}_{i=1}^{N}$ for more than l<L packets. The system also tunes l so that users will not be incorrectly excluded. On the other hand, if a user's probability is ranked among the $K_s$ largest for more than l<L packets, the system grants the user's association to the device with full confidence at that time. Mathematically, for user i and device j, the system can set $I_{\eta,t}(j) \cdot W_{\eta,t}(j) \cdot P_{\eta,t}(i,j)=1$, and other elements in the j-th row of $P_{\eta,t}$ to zero.

Therefore, according to the above descriptions, using device and user profile estimations 307, 309, cross-modal feature matching with uncertainty 333, heterogeneous feature fusion with probability monitoring 335, and video analytics based temporal weighing 331, the system can perform uncertainty-aware human identification robustly in real-time. The overall algorithms of the system are described in the algorithm illustrated in FIG. 4. The input of the algorithm is the wireless (e.g., Wi-Fi, Bluetooth, UWB) data 301 and image (e.g., video) data 303 in a window of L packets. Of course, as explained above, even though Wi-Fi and video data are referred to, other forms of wireless communication and image data can be utilized, and the algorithm is but one embodiment of the teachings herein. The total number of users is N and the total number of device is $N_s$. The algorithm output is the most likely user-device associations $\{(ID_{c,j}, ID^*(j))\}_{j=1}^{N_s}$ and association probabilities (i.e., $\{P_j\}_{j=1}^{N_s}$). Given one CSI data at time t, the system computes one device profile 307, including probabilistic estimates of AoA 315, distance 317 and activity 319 with uncertainty, as shown in line 4 of the algorithm. In line 6 of the algorithm, user profiles 309 are generated to include user AoA 327, distance and activity recognition 329, 331, which are then used to do cross-modal feature matching with similarity scores at 333 to compute matching probability in line 7. In line 8, the significance for all features are computed, which weighs important moments, and later used to compute weighted association probability matrix $P_{\eta,t}$ in Line 10. Then for each feature, association probability vector $P_{\eta,t}$ is weighted for association probability monitoring. Line 13 shows if user i has one of the largest matching probabilities for a prolonged period of time, sufficient confidence is assigned to the user as the device carrier and set its association probability at time t to 1, illustrated in line 17. If a user's matching probabilities of any feature is ranked as one of the lowest for a prolonged period of time, the system excludes the candidacy of this user-device association in Line 15. Finally, the system chooses the most likely association from the remaining candidates. The algorithm runs for every smartphone that transmits wireless packets to the receiver or transceiver, e.g., of wireless unit 101. The user-device association for all devices $\{(ID_{c,j}, ID^*(j))\}_{j=1}^{N_s}$ and association probabilities $\{P_j\}_{j=1}^{N_s}$ are returned.

Applications of the above described systems can include human identification applications 339 described in the examples above, such as (i) a personalized public address (e.g., in the event of a threat within a public area where the message is better directed to only a subset of the persons in the vicinity), or (ii) behavior understanding of shoppers in retail stores for better targeted advertisements or coupons, for example. Of course the system disclosed is not limited to only these applications; instead, the systems disclosed herein can be tailored for use in a variety of applications in which it would be beneficial to identify and track a particular person.

Several limitations and opportunities are provided by the system disclosed herein. A common environmental change will be the change of area layouts (e.g., walkway) and large furniture (e.g., shelf) that could introduce packet noise and degrade system performances. To address this issue, online calibration of CSI features can be done automatically, using data samples generated by video analytics. Also, the computation can be done in real-time even with a large amount of users, since the complexity of our fusion algorithm is linear to the number of users.

The system framework design is not exclusive to new techniques and features. First, the framework can scale to include more sophisticated wireless-based and vision-based techniques to derive features of multiple users. Second, location estimation and activity recognition could scale to additional representations. For example, the system can incorporate additional types of activities (e.g., run, step count, taking phone out, rotate phone, blocking, etc.), and even hand gestures that are possible to be captured by both camera and wireless sensing independently. These types of activities may be used in the weighting described above.

In order to re-identify users, the system may require an identification marker, e.g., a Wi-Fi MAC address. Users who use apps on their devices or connect their device to a public Wi-Fi AP periodically send packets with the original MAC address, thus can be tracked by this disclosure's system. Devices that are not connected to a Wi-Fi AP but turn on the Wi-Fi interface will periodically generate SSID broadcast packets which can be used for tracking them. Some smartphones perform MAC address randomization that can be defeated using several techniques. The system disclosed herein employs several mechanisms to protect user privacy. For example, after collecting an IP address or overhearing a Wi-Fi MAC address, it can hash the address to a unique number and uses that number consequently as a consistent identification marker. Also, the association between this marker and the actual user is not stored to protect user privacy.

The system disclosed herein leverages high-fidelity vision-based human tracking algorithms in the visual sensing modality. So, the performance of such algorithms affects the overall identification accuracy of the system. Common causes of vision-based human tracking errors include detection inaccuracy, occlusions, and incorrect detection-track associations. Detection inaccuracy could introduce errors in the locations of users. However, as the system is uncertainty-aware, it can assign higher weights to the moments when users' visual features are more distinct and the effect of detection inaccuracy is minimum. Meanwhile, the system fuses activities and potentially more heterogeneous features to avoid large performance degradation due to errors from a single feature. In the worst case, occlusion could make a vision-based human tracking algorithm lose the motion trajectory of a user when he is fully invisible. Human re-identification algorithms could be used to re-identify such a user when being visible again and the system has the potential to improve re-identification using only the device profile to estimate the trajectory of its user. Incorrect association happens when the algorithm assigns a motion trajectory of a different person to an individual. This could be mitigated using techniques and the system is able to identify and skip the moments when users are too close when the probability of incorrect association is large.

In utilizing the system, the location and orientation of the wireless receiving units are known, and the (e.g., Wi-Fi) antennas are exposed to the environment. Wireless routers and infrastructure are usually not visible in some places when mounted on a ceiling. However, surveillance cameras are usually visible. Wi-Fi-enabled cameras can be built in a way that the antennas will be outside of a ceiling, although there could be an enclosure around them. If the Wi-Fi receiving component and the camera are placed in the same unit, then both units can have a shared coordinate system with (0,0) at the center of the unit. In that case, an initial calibration of the camera and an initial phase calibration of the antenna chains of the receiving Wi-Fi unit are sufficient, without measuring the exact location of the system. However, if the system uses two separate units in two nearby areas (e.g., one for the camera and another one for the Wi-Fi receiver), then the antennas of the Wi-Fi receiver do not need to protrude from the camera. In that case, the field of view of the camera and the range of the Wi-Fi receiver should cover a similar area. However, during the installation of camera and Wi-Fi units, the relative distance ($\Delta x$, $\Delta y$) between both units need to be measured, and then during the trajectory matching the camera coordinate system can be translated to the Wi-Fi coordinate system, and then the AoA can be matched. In fact, the system employs such a coordinate translation method for trajectory matching in the dining area experiments.

This disclosure therefore presents RFCam, a system for identifying human with mobile devices using fusion of Wi-Fi and camera data. RFCam aims to introduce a new way to connect video analytics in surveillance camera systems with wireless mobile devices, enabling novel applications and services. The fusion framework in RFCam provides fundamental techniques that take advantage of high fidelity visual sensing to improve high uncertainty wireless sensing, and leverages dual-modality profile estimation to achieve accurate and efficient user identification in real-time.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of identifying a person utilizing a camera and a wireless transceiver, the method comprising:
   receiving, at the wireless transceiver, packets from one or more mobile devices associated with one or more persons in a vicinity of the wireless transceiver;
   determining channel state information (CSI) data based on a signal associated with the packets;
   determining first motion characteristics associated with the one or more persons based on the CSI data;
   receive image data associated with images generated from the camera, wherein the image data is associated with the one or more persons in the vicinity;
   determining second motion characteristics associated with the one or more persons based on the image data;
   matching the first motion characteristics with the second motion characteristics to derive matched motion characteristics;
   assigning vision-based weights to the matched motion characteristics, wherein the weights are based on the second motion characteristics determined based on the image data and not the signal associated with the packets received from the one or more mobile devices; and
   identifying the one or more persons based on the matched motion characteristics and the weights.

2. The method of claim 1, further comprising:
   adjusting the weights based on a change in the second motion characteristics.

3. The method of claim 2, wherein a portion of the matched motion characteristics are weighted heavier at times during the change in the second motion characteristics.

4. The method of claim 1, further comprising:
   fusing the matched motion characteristics based on the weights associated with the second motion characteristics.

5. The method of claim 1, further comprising:
   quantifying an uncertainty of the first motion characteristics.

6. The method of claim 5, wherein the step of matching is performed based on the quantified uncertainty.

7. The method of claim 5, wherein the step of quantifying is performed based on a level of uncertainty of a wireless signal from one or more of the mobile devices.

8. The method of claim 1, wherein the second motion characteristics include activity associated with the one or more person in the image data.

9. The method of claim 1, further comprising communicating data from the wireless transceiver to an application stored on the mobile device of the identified one or more persons.

10. A method of identifying a person utilizing a camera and a wireless transceiver, the method comprising:
- determining channel state information (CSI) data received at the wireless transceiver based on a signal associated with the packets from one or more mobile devices associated with one or more persons in a vicinity of the wireless receiver;
- determining first motion characteristics associated with the one or more persons based on the CSI data;
- quantifying an uncertainty of the first motion characteristics;
- receive image data associated with images generated from the camera, wherein the image data is associated with the one or more persons in the vicinity;
- determining second motion characteristics associated with the one or more persons based on the image data;
- matching the first motion characteristics with the second motion characteristics based on the quantified uncertainty to derive matched motion characteristics;
- assigning vision-based weights to the matched motion characteristics, wherein the weights are based on the second motion characteristics determined based on the image data and not based on the signal associated with the packets from the one or more mobile devices; and
- identifying the one or more persons based on the matched motion characteristics and the weights.

11. The method of claim 10, wherein the step of quantifying is performed based on a level of uncertainty of a wireless signal from one or more of the mobile devices.

12. The method of claim 10, further comprising:
- adjusting the weights based on a change in the second motion characteristics.

13. The method of claim 12, wherein a portion of the matched motion characteristics are weighted heavier at times during the change in the second motion characteristics.

14. The method of claim 10, wherein the first motion characteristics include angle of arrival (AoA), or distance between the one or more persons or the one or more mobile devices and the wireless transceiver.

15. A system for identifying a person utilizing a camera and a wireless transceiver, the system comprising:
- a wireless transceiver configured to receive packets from one or more mobile devices associated with one or more persons in a vicinity of the wireless transceiver;
- a camera configured to obtain images of the one or more persons in the vicinity; and
- a processor in communication with the wireless transceiver and the camera, the processor programmed to:
- determine channel state information (CSI) data based on a signal associated with the packets,
- determine first motion characteristics associated with the one or more persons based on the CSI data,
- receive image data associated with the images,
- determine second motion characteristics associated with the one or more persons based on the image data,
- match the first motion characteristics with the second motion characteristics to derive matched motion characteristics,
- assign weights to the matched motion characteristics, wherein the weights are based on the second motion characteristics and not based on the signal associated with the packets from the one or more mobile devices, and
- identify the one or more persons based on the matched motion characteristics and the weights.

16. The system of claim 15, wherein the processor is further programmed to:
- adjust the weights based on a change in the second motion characteristics.

17. The system of claim 16, wherein a portion of the matched motion characteristics are weighted heavier at times during the change in the second motion characteristics.

18. The system of claim 15, wherein the processor is further programmed to quantify an uncertainty of the first motion characteristics based on a level of uncertainty of a wireless signal from one or more of the mobile devices, and wherein the processor is programmed to match the first motion characteristics with the second motion characteristics based on the uncertainty.

19. The system of claim 15, wherein at least one of the first motion characteristics and the second motion characteristics include an estimated angle of arrival (AoA).

* * * * *